(12) United States Patent
Testa et al.

(10) Patent No.: US 12,259,587 B2
(45) Date of Patent: Mar. 25, 2025

(54) OPTICAL CONNECTOR FOR PHOTONIC CIRCUITS

(71) Applicant: Telefonaktiebolaget LM Ericsson (publ), Stockholm (SE)

(72) Inventors: Francesco Testa, Pisa (IT); Alessandra Bigongiari, Pisa (IT); Luigi Tallone, Pisa (IT); Gabriele De Angelis, Pisa (IT); Marco Romagnoli, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 17/909,897

(22) PCT Filed: Mar. 9, 2020

(86) PCT No.: PCT/EP2020/056214
§ 371 (c)(1),
(2) Date: Sep. 7, 2022

(87) PCT Pub. No.: WO2021/180303
PCT Pub. Date: Sep. 16, 2021

(65) Prior Publication Data
US 2023/0094780 A1    Mar. 30, 2023

(51) Int. Cl.
*G02B 6/42*    (2006.01)
(52) U.S. Cl.
CPC ................ *G02B 6/4214* (2013.01)

(58) Field of Classification Search
CPC .................................................. G02B 6/4214
See application file for complete search history.

(56) References Cited

U.S. PATENT DOCUMENTS

| 9,417,408 B2 | 8/2016 | Kadar-Kallen |
| 2017/0261703 A1* | 9/2017 | Bowen ................ G02B 6/423 |
| 2018/0306991 A1* | 10/2018 | Epitaux ................ G02B 6/138 |

OTHER PUBLICATIONS

International Search Report and Written Opinion dated Dec. 11, 2020 for International Application No. PCT/EP2020/056214 filed Mar. 9, 2020; consisting of 10 pages.
Scarcella, Carmelo, et al.; Pluggable Single-Mode Fiber-Array-to-PIC Coupling Using Micro-Lenses; IEEE Photonics Technology Letters; Nov. 15, 2017; vol. 29, No. 22, IEEE; consisting of 4 pages.

(Continued)

*Primary Examiner* — Sung H Pak
(74) *Attorney, Agent, or Firm* — Weisberg I.P. Law, P.A.

(57) ABSTRACT

An optical connector for a photonic circuit. The optical connector includes a first part, fixable to a photonic circuit, having at least one slab of optically transparent material, the at least one slab including a first lens. The optical connector includes a second part, movable between a connected position adjacent the first part and a disconnected position removed from the first part. The second part includes at least one slab of optically transparent material, the at least one slab including a second lens located to be in alignment with the first lens in the connected position. One or more guiding elements are arranged to direct light to the second lens. The second part is configured to connect the one or more guiding elements to an optical fiber.

20 Claims, 6 Drawing Sheets

(56) References Cited

OTHER PUBLICATIONS

Rosenberg, Paul, et al.; CWDM transceiver for mid-board optics; Optical Interconnects XVII, Proc. of SPIE vol. 10109 101090B-2; 2017; consisting of 11 pages.

Taira, Yoichi, et al.; Precision Assembly of Polymer Waveguide Components for Silicon Photonic Packaging; IEEE; 2014; consisting of 4 pages.

* cited by examiner

OPTICAL CONNECTOR FOR PHOTONIC CIRCUITS

CROSS-REFERENCE TO RELATED APPLICATION

This application is a Submission Under 35 U.S.C. § 371 for U.S. National Stage Patent Application of International Application Number: PCT/EP2020/056214, filed Mar. 9, 2020 entitled "OPTICAL CONNECTOR FOR PHOTONIC CIRCUITS," the entirety of which is incorporated herein by reference.

TECHNICAL FIELD

The disclosure relates to an optical connector for photonic circuits and to an optical assembly comprising the optical connector and a photonic circuit.

BACKGROUND

The use of silicon photonics technology is being extended from the current low-medium volume application in multi-channel transceivers packaged in pluggable modules, for intra-data centre interconnection, to a more pervasive use in optical multi-chip modules, OMCM, in new high bandwidth hardware platforms for chip to chip and board to board interconnect.

This has been driven by the increased demand for bandwidth and bandwidth spatial density that has resulted in electro-optical interfaces being moved closer to the high data rate electronic ports of electronic switches, field-programmable gate arrays, FPGAs, and other high processing capacity digital application specific integrated circuits, ASICs.

OMCMs integrate electronic and photonic chips in the same substrate/package, with reduced power consumption and low footprint. It is expected that OMCMs will first be used in high capacity switches for data centres and in big IP routers and use will then extend to other applications, such as high-speed interconnect between chips on a board and between boards in radio equipment. In a typical OMCM, the signal processing is performed by an electronic chip with signal input/output being performed by a photonic chip interconnected with optical fibers to other chips or other boards.

One of the most significant challenges to be overcome to reach the commercial phase of OMCM is the realization of a reliable, low cost, low loss, small size, low profile, pluggable optical connection of silicon photonic chip to optical fiber arrays. The connection must include many optical fibers and should support automated assembly to be suitable for mass production (with high production throughput). Finally, the connection should be able to be mounted during the OMCM packaging process using standard assembly machines and be compatible with PCB soldering processes: this is not possible in standard chip-to fiber-coupling techniques due to the adhesive and to fiber coating that cannot withstand the high soldering temperature.

Carmelo Scarcella et al, *"Pluggable Single-Mode Fiber-Array-to-PIC Coupling Using Micro-Lenses"*, IEEE Photonics Technology Letters, vol. 29, no. 22, 15 Nov. 2017, pages 1943-1946, proposes fiber-to-PIC grating coupling with an insertion-loss of 1.7 dB at 1300 nm, and a 1 dB alignment tolerance of ±30 µm, by means of microlens arrays. However, the height of this connector is quite high.

Paul Rosenberg et al, "CWDM transceiver for mid-board optics", Optical Interconnects XVII, Proc. of SPIE vol 10109, proposes a pluggable optical connector that is compatible with reflow soldering but it is based on a special component, the CWDM light turn ferrule/filter assembly, that simultaneously multiplexes the CWDM signals and couples the wavelength comb to a single output fiber. However, this connector cannot be used in parallel optical transceivers and the height is quite high for use in multi-chip modules with the optical transceiver co-packaged with a digital ASIC.

SUMMARY

It is an object to provide an improved optical connector for photonic circuits. It is a further object to provide an improved optical assembly comprising the optical connector and a photonic circuit chip.

An aspect of the invention provides an optical connector for a photonic circuit, the optical connector comprising a first part, fixable to a photonic circuit, and a second part, movable between a connected position adjacent the first part and a disconnected position removed from the first part. The first part comprises at least one slab of optically transparent material. The at least one slab includes a first lens. The second part comprises at least one slab of optically transparent material. The at least one slab includes a second lens and one or more guiding elements arranged to direct light to the second lens. The second lens is located to be in alignment with the first lens in the connected position. The second part is configured to connect the one or more guiding elements to an optical fiber.

The optical connector is advantageously compatible with soldering reflow processes and temperatures, small in both size and height, is suitable for use in all types of high bandwidth density optical interconnects, including both parallel-type and CWDM-type transceivers. The connector is also able to be mounted during the OMCM packaging process using standard assembly machines, with vision alignment.

An aspect of the invention provides an optical assembly comprising a photonic circuit, an optical fiber and an optical connector. The photonic circuit includes a grating coupler. The optical connector comprises a first part and a second part, movable between a connected position adjacent the first part and a disconnected position removed from the first part. The first part comprises at least one slab of optically transparent material. Said at least one slab includes a first lens. The first part is fixed to the photonic circuit such that the grating coupler is located at a focal point of the first lens. The second part comprises at least one slab of optically transparent material. Said at least one slab includes a second lens and one or more guiding elements. The second lens is located to be in alignment with the first lens in the connected position. The second part is configured to connect the one or more guiding elements to an optical fiber.

The optical assembly is advantageously compatible with soldering reflow processes and temperatures. The optical connector is advantageously small in both size and height, meaning that the height of the optical assembly can also be relatively small even though light leaves the photonic circuit vertically, through the grating coupler. The optical assembly is suitable for use in all types of high bandwidth density optical interconnects, including both parallel-type and CWDM-type transceivers. The optical assembly may advantageously be assembled using standard assembly machines, with vision alignment.

BRIEF DESCRIPTION OF THE DRAWINGS

Embodiments of the disclosure will now be described, by way of example only, with reference to the accompanying drawings.

DETAILED DESCRIPTION

The same reference numbers will used for corresponding features in different embodiments.

Figure 1:
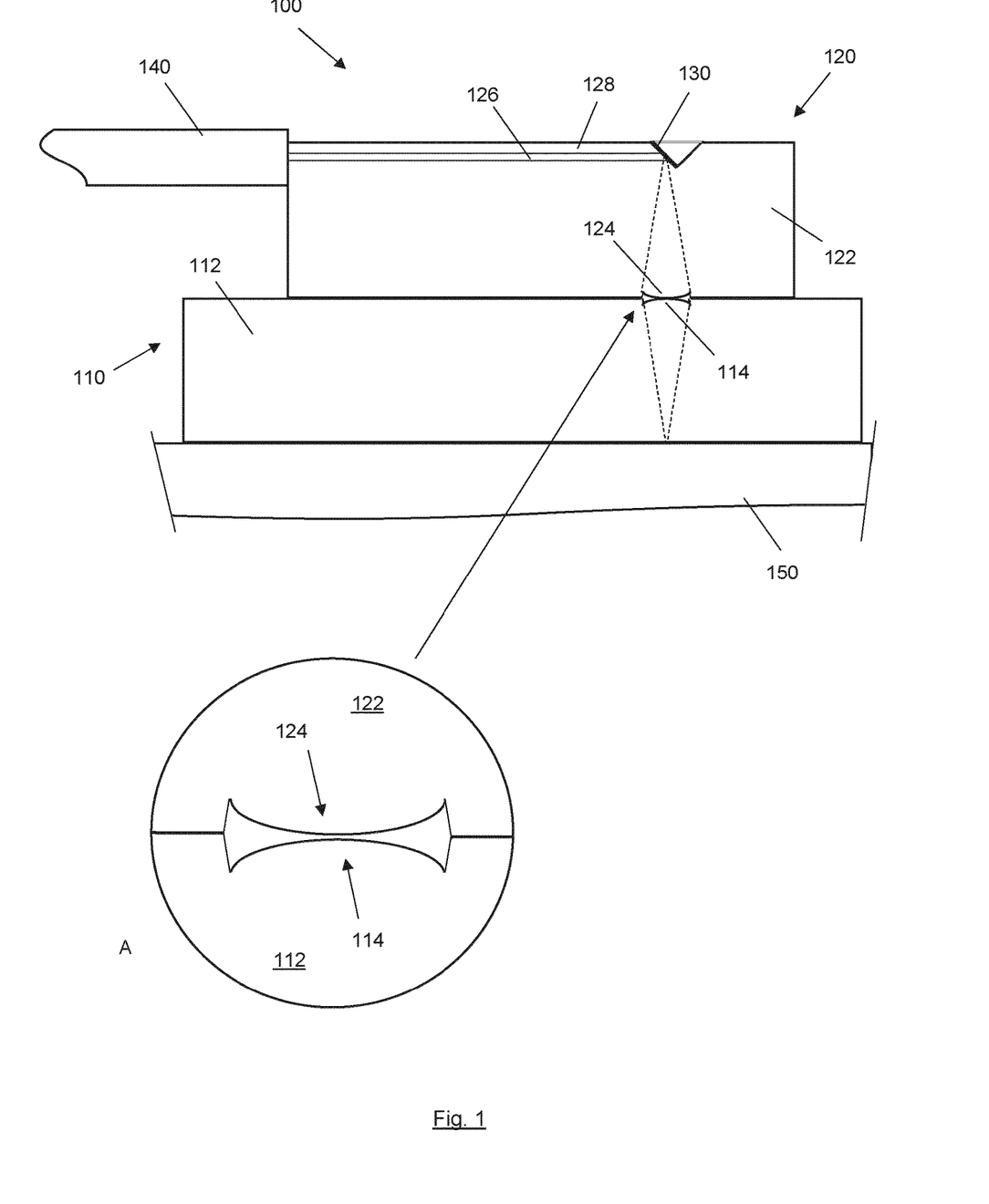
FIGS. 1 to 5 illustrate optical connectors according to the disclosure, with FIGS. 1, 2 and 5 also illustrating optical assemblies according to the disclosure.

Referring to FIG. 1, an embodiment provides an optical connector 100 for a photonic circuit, in this example a photonic integrated circuit, PIC, provided on a chip 150. The optical connector comprises a first part 110 fixable to the photonic circuit and a second part 120 that is movable between a connected position adjacent the first part (as illustrated in FIG. 1) and a disconnected position, removed from the first part.

The first part 110 comprises a first slab 112 of optically transparent material, for example silica. The first slab includes a first lens 114. The second, removable, part 120 comprises a second slab 122 of optically transparent material, for example silica. The second slab includes a second lens 124 and guiding elements in the form of a waveguide 126 and a routing element 130.

As shown in more detail in the expanded inset A in FIG. 1, the first lens 114 is provided at, or adjacent, a surface of the first slab 112. The second lens 124 is provided at, or adjacent, a surface of the second slab 122. The first lens 114 is arranged to collect light from, and deliver light to, a grating coupler of the photonic circuit (as will be described further below). The second lens 124 is located so that it is in alignment with the first lens 114 when the second part 120 is in the connected position. The first lens 114 is formed inset into the top surface of the first slab 112 and the second lens 124 is formed inset into the bottom surface in the second slab 122. The lenses are arranged like this so that a gap is provided between them when the second part is in the connected position; in the connected position the bottom surface of the second slab 122 contacts the top surface of the first slab 112, which ensures that the slabs 112, 122 remain parallel. The gap between the lenses may simply be an air gap or it may be filled with a material having a lower refractive index than the slabs 112, 122.

The lenses 114, 124 could alternatively be provided buried within the respective slabs 112, 122. Providing the lenses at respective surfaces, as shown here, may be chosen for ease of manufacture. The lenses 114, 124 are refractive lenses.

The lenses 114, 124 collimate light output from the waveguide (i.e. guiding elements) and received from the grating coupler of the photonic circuit. As such, the lenses operate in both directions to transfer light between the photonic circuit and an input/output of the connector, e.g. attached to an optical fiber. This relaxes alignment tolerances between the parts of the connector, i.e. using the lenses, and thus between the first slab and the second slab in the connected position. This advantageously enables passive, visual alignment of the parts rather than requiring use of complex flip-chip machines.

The waveguide 126 is buried in the second slab, adjacent the top (as oriented in the drawing) surface. A cladding layer 128 is provided across the top surface of the second slab, covering the waveguide. Typically, when a cladding layer is provided it extends across the whole surface of the slab. The cladding layer is not essential, air cladding could be used instead.

The guiding elements are configured to guide light from an input/output port of the connector to the lens 124. The guiding elements provide for a direction change of the light, e.g. a 90° change in direction, e.g. from a direction parallel to a surface of the photonic chip to a to a direction perpendicular to the surface of the photonic chip.

The guiding elements may comprise a routing element in the form of a mirror 130. The mirror is provided at one end of the waveguide 126. In some examples, the mirror 130 may be buried in the slab 122, adjacent or below the cladding layer 128. The mirror is angled to the end of the waveguide, to direct light output from the waveguide towards the second lens (and, conversely, to direct light received from the second lens into the waveguide). In the example shown, the mirror is angled at 45° to the waveguide 126. As such, the mirror 130 provides a 90° turn in the path taken by the light through the second slab. The mirror 130 is located at the focal point of the second lens, as indicated by the dotted lines in FIG. 1.

Alternatively, the routing element 130 could be a further waveguide, or a continuation of the waveguide 126, for example a curved waveguide, extending from the end of the waveguide 126 towards the second lens 124.

The second part 122 is configured to connect to an optical fiber 140, i.e. at an input/output port. The second part 122 is configured to optically connect the optical fiber to the waveguide 126. For example, the waveguide 126 is aligned centrally to the optical fiber, to couple light into/from the fiber core. The optical fiber may be a single mode optical fiber or a multi-mode optical fiber and the second part 122 is configured to butt-couple the optical fiber to the waveguide. The optical fiber may be held in position on the second part using conventional techniques, e.g. based on a V-groove in a silica mount.

The waveguide 126 is configured so that its mode matches the mode of the optical fiber 140 as closely as possible, in order to couple light from the waveguide to/from the fiber with low loss.

Figure 2:
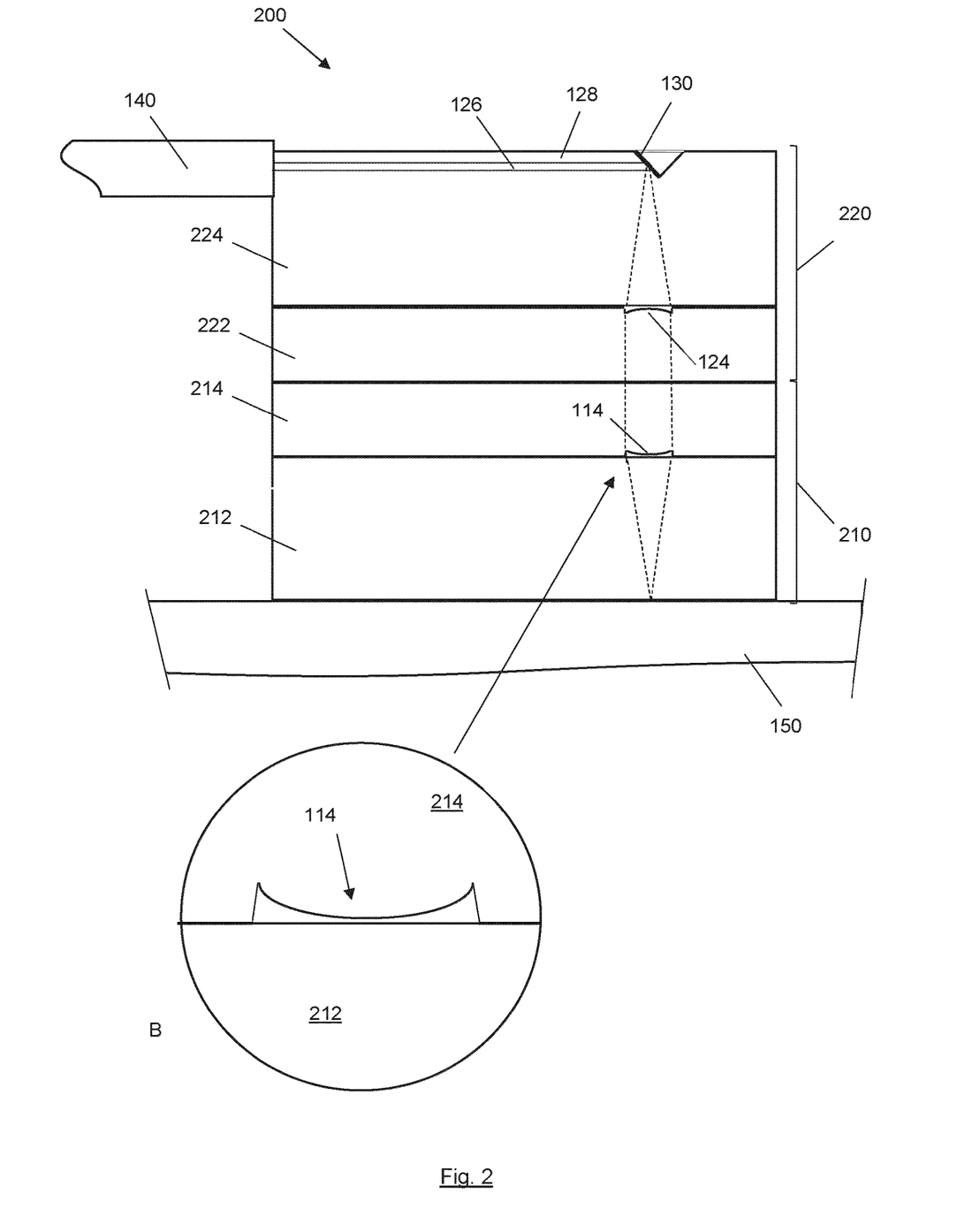

Referring to FIG. 2, an embodiment provides an optical connector 200 for a photonic circuit 150.

In this embodiment, a first part 210 of the connector 200 comprises a first slab 212 of optically transparent material and a second slab 214 of optically transparent material. The second slab 214 comprises the first lens 114, as described above. A second part 220 of the connector 200 comprises a third slab 222 of optically transparent material including the second lens 124, as described above. The second part 220 further comprises a fourth slab 224 of optically transparent material, including the guiding elements, e.g. waveguide 126 and mirror 130, as described above. The slabs are silica slabs but it will be appreciated that the slabs may alternatively be formed from other optically transparent materials, such as a glass or a polymer.

The first slab and the second slab are fixed together, and the third slab and the fourth slab are fixed together. As such, the connector provides for separation or removal connection of the first and second parts 210,220. The first and second slabs form a single unit which is not separable in use, and also, the third and fourth slabs form a single unit which is not separable in use. As oriented in the drawing, the slabs are ordered first slab, second slab, third slab and fourth slab moving outwardly (i.e. upwardly) from the photonic circuit 150, when the second part is in the connected position, as shown in FIG. 2. Alignment of the first and second slabs, and of the third and fourth slabs, is achieved using markers formed on the respective opposing surfaces of the slabs; the markers may be formed using conventional photolithographic processes. The markers used for slab alignment must be implemented with high accuracy, preferably less than 1 μm, but this can be guaranteed by using photolithographic process to form them.

As shown in more detail in the expanded inset B in FIG. 2, the first lens 114 is provided at, or adjacent, a surface of the second slab 214. The second lens 124 is provided at a surface of the third slab 222. In some examples, the first lens 114 is formed inset into the bottom surface of the second slab 214 and the second lens 124 is formed inset into the top surface in the third slab 222. The lenses are arranged like this so that a gap is provided between a surface of the lens and the opposing surface of the adjacent slab. The gap may simply be an air gap or it may be filled with a material having a lower refractive index than the slabs 214, 222. The lenses 114, 124 could alternatively be provided buried within the respective slabs or provided on different surfaces; for example, the lenses could may be provided at adjacent, opposing surfaces (as in the embodiment described with reference to FIG. 1), or the first lens 114 may be provided at the top surface of the first slab 212 and the second lens provided at the bottom surface of the fourth slab 224. In some examples, the light between the lenses is collimated, i.e. light rays are parallel or focus at infinity. As such, the distance between the lenses is not critical for alignment.

The embodiment of FIG. 2 provides a connector with the lenses 114,124 spaced apart. The lenses are spaced by material, e.g. by located on distant sides of slabs, by being spaced by one or more separate slabs or by being buried within a slab. In some examples, the connector may comprise only one slab separating the lenses, or may comprise one or more additional slabs separating the lenses.

In this embodiment, when the second part is in the connected position, the bottom surface of the third slab 222 contacts the top surface of the second slab 214.

Figure 3:
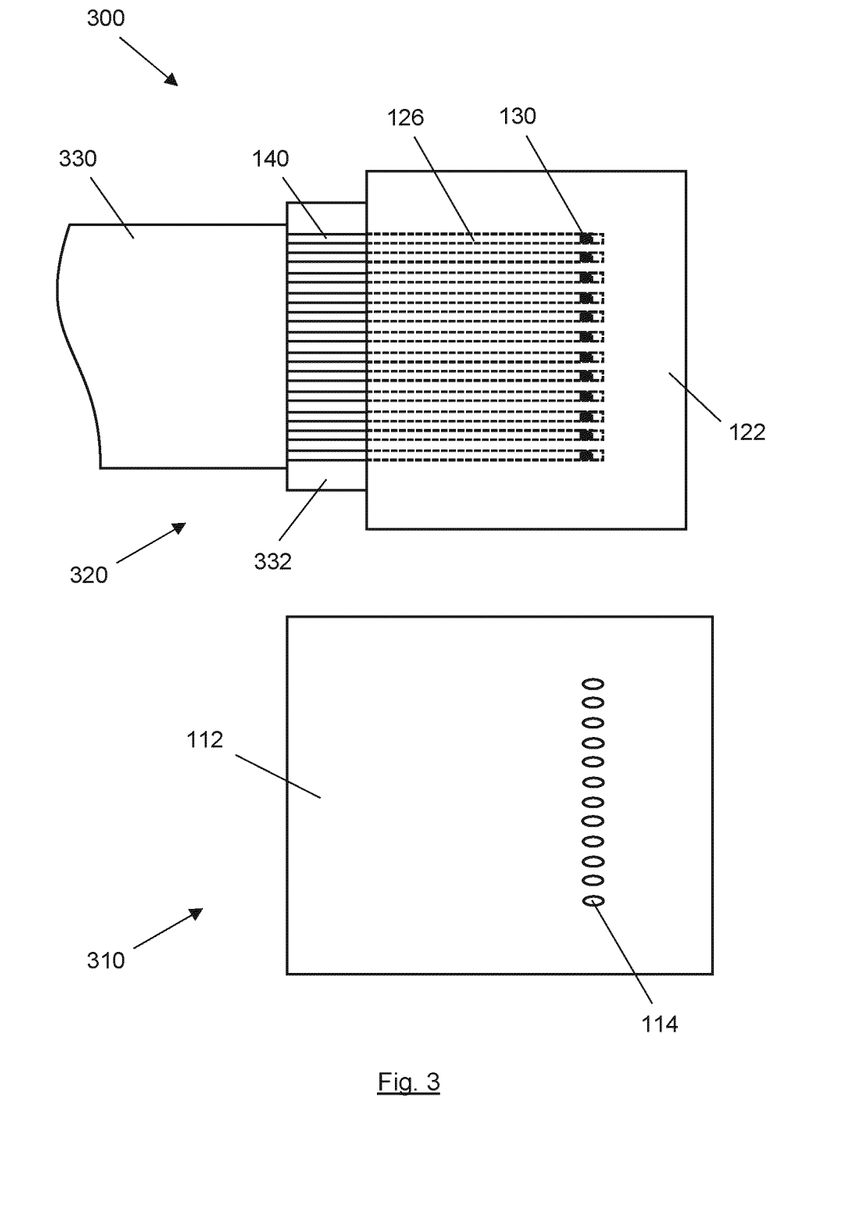

An embodiment, shown in FIG. 3, provides an optical connector 300 according to any example, e.g. similar to the optical connector 100 of FIG. 1, comprising a first part 310 and a second part 320. The first slab 112 includes a plurality of first lenses 114, arranged in a linear array. The second slab 122 includes a plurality of second lenses 124 and a plurality of guiding elements, in the form of a plurality of waveguides 126 and a plurality of mirrors 130, each arranged in respective linear arrays. The second lenses are located to be in alignment with respective first lenses when the second part is in the connected position (as shown in FIG. 1).

The second part is configured to connect the waveguides 126 to respective optical fibers 140 within a ribbon cable 330. The second part includes a silica mount 332 having V-grooves provided in it, in which the optical fibers 140 are located. The optical fibers are butt-coupled to the waveguides.

Figure 4A:
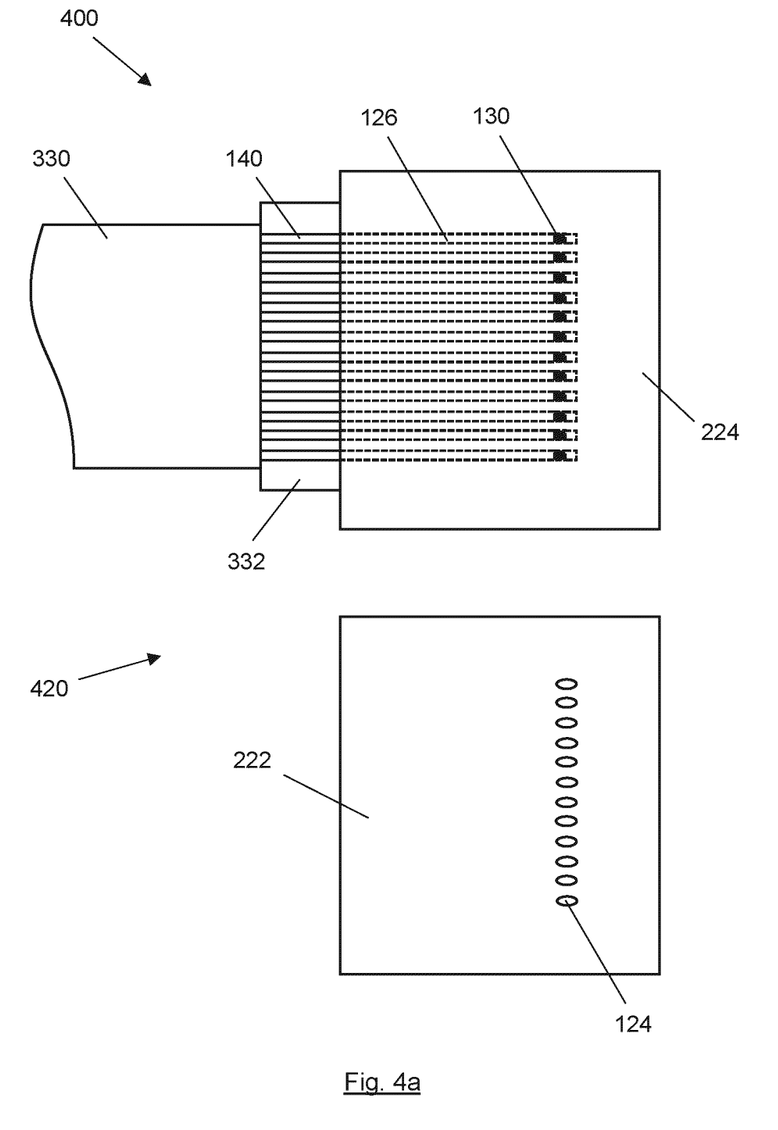
Figure 4B:
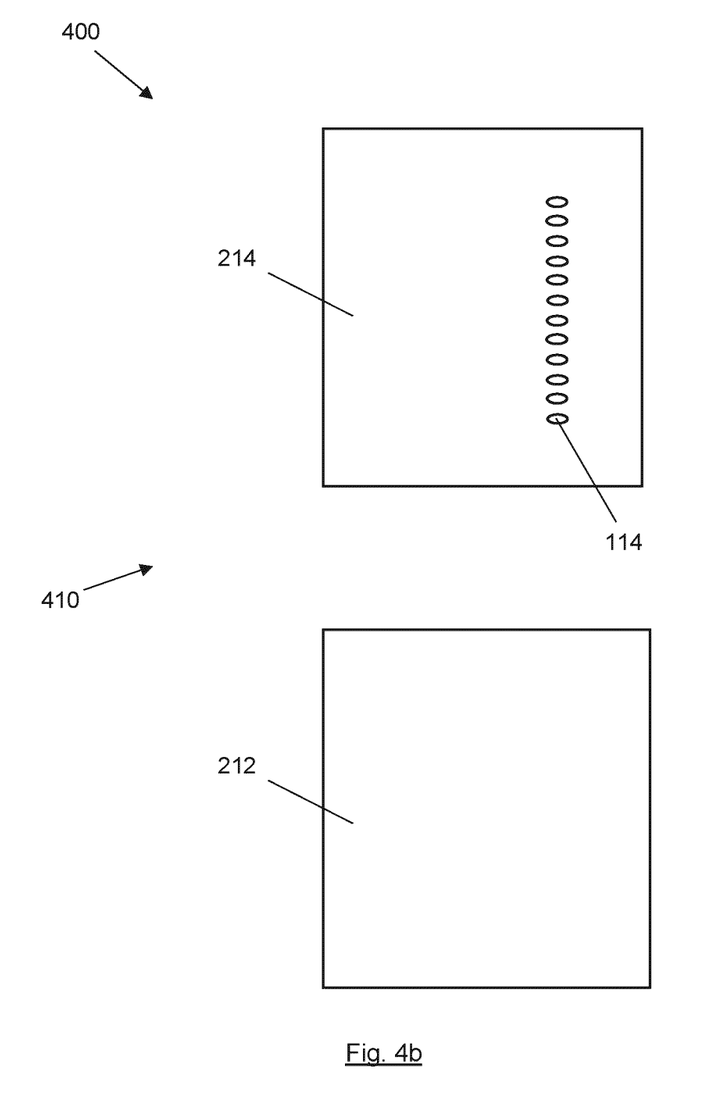

An embodiment, shown in FIGS. 4a and 4b, provides an optical connector 400, similar to the optical connector 200 of FIG. 2, comprising a first part 410 (FIG. 4b) and a second part 420 (FIG. 4a). The second slab 214 in this embodiment includes a plurality of first lenses 114, arranged in a linear array. The third slab 222 includes a plurality of second lenses 124, arranged in a linear array. The fourth slab 224 includes a plurality of guiding elements, namely a plurality of waveguides 126 and a plurality of mirrors 130, each arranged in linear arrays.

As in the previous embodiment, the second part 420 is configured to connect the waveguides 126 to respective optical fibers 140 within a ribbon cable 330. The second part includes a silica mount 332 having V-grooves provided in it, in which the optical fibers 140 are located. The optical fibers are butt-coupled to the waveguides.

While the optical connector 400 of this embodiment is formed from a greater number of silica slabs than the optical connector 300 of the previous embodiment, and may as a result have a higher profile, forming the guiding elements 126, 130, and the second lens 124 in different silica slabs advantageously removes the need for the high accuracy positioning of the mirror 130 and the second lens 124 that is required when they are formed in a single silica slab.

Figure 5:
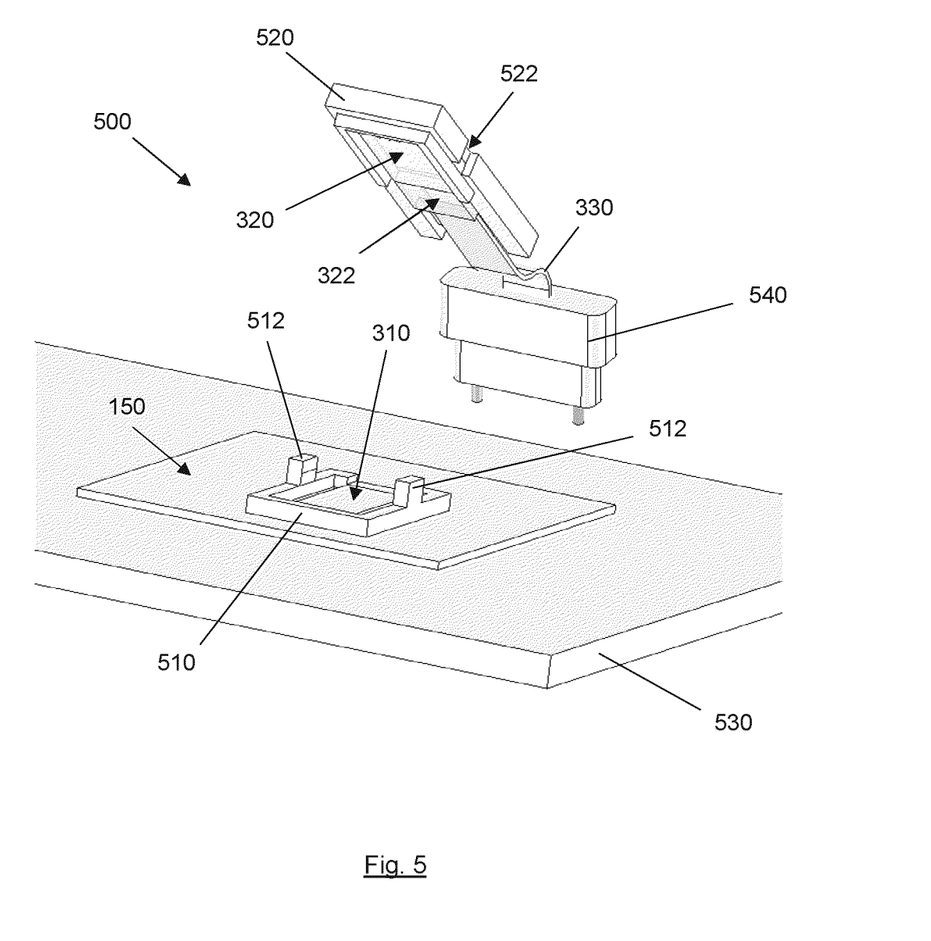

Referring to FIG. 5, an embodiment provides an optical connector 500 according to any example, e.g. similar to the optical connector 300 described with reference to FIG. 3. The connector 500 additionally comprises a first housing part 510 and a second housing part 520.

The first housing part 510 holds, or is attached to, the first part 310 of the optical connector and the second housing part 520 holds, or is attached to, the second part 320 of the optical connector. The first housing part 510 has first connector elements, in the form of lugs 512, and the second housing part has second connector elements, in the form of grooves 522. The first and second connector elements are configured to engage together, to position and/or attach together the parts of the connector. For example, the lugs are configured to push fit into the grooves, to hold the housing parts together and thus hold the first part 310 and the second part 320 of the optical connector in the connected position, as shown in FIG. 1. The first and second housing parts, e.g. using the first and second connector elements, are configured to maintain the first slab 112 parallel to the second slab 122 in the connected position.

The first housing part 510 and/or the first part 310 are fixed to a PIC chip 150, provided on an insulator platform 530. The optical fiber ribbon cable 330 may be connected to any type of commercial connector for ribbon fiber cables or single fiber cables 540, for interconnecting the photonic circuit to a cable for interconnection to other chips or other boards.

The same arrangement of first and second housing parts 510, 520 may be equally applied to the optical connector 400 described with reference to FIGS. 4a and 4b or any other example.

Referring again to FIG. 1, an embodiment of the invention provides an optical assembly comprising a photonic circuit 150, an optical fiber 140 and an optical connector 100, as described above with reference to FIG. 1.

The photonic circuit includes a grating coupler, and the first part 110 of the optical connector is fixed to the photonic circuit such that the grating coupler is located at a focal point of the first lens 114.

Referring again to FIG. 2, an embodiment of the invention provides an optical assembly comprising a photonic circuit 150, an optical fiber 140 and an optical connector 200, as described above with reference to FIG. 2.

The photonic circuit includes a grating coupler and the first part 212 of the optical connector is fixed to the photonic circuit such that the grating coupler is located at a focal point of the first lens 114.

Referring again to FIG. 5, an embodiment of the invention provides an optical assembly comprising a photonic circuit 150, an optical fiber 140 and an optical connector 300, as described above with reference to FIG. 3.

The photonic circuit includes a plurality of grating couplers, e.g. arranged in a linear array. The first part 410 of the optical connector is fixed to the photonic circuit such that the grating couplers are respectively located at the focal points of the first lenses 114.

The optical connector may alternatively be an optical connector 400 as described above with reference to FIGS. 4a and 4b. The first part 112 of the optical connector is fixed to the photonic circuit such that the grating couplers are respectively located at the focal points of the first lenses 114.

Examples of the disclosure provide for attaching one or more optical fibers to a photonic circuit. The connector is separable into two parts, one part attached to the photonic circuit and one part attached to the optical fiber. In the connected position, the two parts of the connector provide for light signal transfer between the photonic circuit (e.g. grating coupler) and the one or more optical fiber. The connector comprises one or more guiding elements to rotate the direction of the light. The connector comprises a lens in each part of the connector. The lenses provide an allowance for a small misalignment of the parts of the connector, without substantially affecting the transfer of the light between the parts of the connector. In the connected position, the lenses are aligned in the optical path, i.e. the light from the optical fiber or photonic chip is transmitted by one lens to the other lens. In particular, both lenses are configured to collimate the light, e.g. the lenses provide for the light to focus at infinity or the lights rays to be parallel. For example, the light source in proximity to each lens is located at the focal point of that lens. For example, the first lens has a focal point at the photonic chip (light source), and the second lens has a focal point on the guiding elements (e.g. mirror 130). The same is applicable for light in the other direction, i.e. each lens is associated with a target on which to focus the light (photonic chip or guiding element). The providing (and receiving) of collimated light across the two parts of the connector means that strict positioning between the parts of the connector are not required. This allows for a passive alignment between the parts of the connector, e.g. mechanical connection provided by the first and second connector elements. In the connected position, the lenses may be adjacent to each other (e.g. as described in FIG. 1) or spaced apart (e.g. as in FIG. 2).

In use, the photonic circuit is connected to the one or more optical fiber via the connector of any example. For light from the optical fiber, the light passes into the one or more slabs of the connector, through the guiding elements, through the second and first lens, and into the photonic circuit. For light generated by the photonic circuit/chip, the light passes into the one or more slabs of the connector, through the first lens and second lens, through the guiding elements and into the one or more optical fiber.

In alternate embodiments, the guiding elements may be located in the slab affixed to the photonic chip (e.g. first slab) instead of the outward slab attached to the optical fiber (e.g. second or fourth slab).

An embodiment of the invention provides an optical connector for a photonic circuit. The optical connector comprises a first part, fixable to a photonic circuit, and a second part movable between a connected position adjacent the first part and a disconnected position removed from the first part.

The first part comprises at least one slab of optically transparent material, the at least one slab including a first lens. The second part comprises at least one slab of optically transparent material. The at least one slab includes a second lens and one or more guiding elements. The second lens is located to be in alignment with the first lens in the connected position. The one or more guiding elements are arranged to direct light to the second lens. The second part is configured to connect the one or more guiding elements to an optical fiber.

The optical connector described in the embodiments may advantageously be used for coupling multiple optical signals from photonic circuits, for example PIC chips such as silicon-on-insulator PICs, to an optical fiber ribbon. The optical connector is formed of a first, fixed, part that is a silica slab or, alternatively, a stack of two silica slabs with an array of lenses and a second, removable, part that is made by a silica slab or, alternatively, a stack of two silica slabs with an array of lenses and an array of mirrors. An optical fiber ribbon is attached to the removable part. The lenses are used to collimate the optical beams and, consequently, relax the alignment tolerances. As such, a connector comprising two separable parts, including the described lenses can be more easily connected together with the required optical alignment. The guiding elements, e.g. mirror, rotates the beams by 90 degrees thereby lowering the connector profile. The optical connector is pluggable and compatible with the standard reflow soldering process used in PCB production.

The invention claimed is:

1. An optical connector for a photonic circuit, the optical connector comprising:
   a first part, fixable to a photonic circuit, comprising a first slab of optically transparent material and a second slab of optically transparent material;
   a first lens situated at an interface between the first slab and the second slab, the first lens having a focal point at a position of the photonic circuit, the first lens being configured to collimate light in the second slab; and
   a second part, movable between a connected position adjacent the first part and a disconnected position removed from the first part, the second part comprising a third slab of optically transparent material and a fourth slab of optically transparent material, the third slab being adjacent to the second slab in the connected position;
   a second lens situated at an interface between the third slab and the fourth slab the second lens having a focal point at a position of an optical element, the second lens being configured to collimate light waves in the third slab, the second lens being located to be in alignment with the first lens in the connected position; and
   the optical element being configured to direct light between the second lens and at least one optical fiber.

2. The optical connector as claimed in claim 1, wherein:
   the a first slab the first lens; and
   the second slab including the second lens.

3. The optical connector as claimed in claim 1, wherein:
   the first slab and the second slab are affixed and the third slab and the fourth slab are affixed.

4. The optical connector as claimed in claim 2, wherein the first lens is inset in a surface of the first slab and the second lens is inset in a surface of the fourth slab.

5. The optical connector as claimed in claim 1, further comprising at least one guiding element configured to guide light between the at least one optical fiber and the optical element.

6. The optical connector as claimed in claim 5, wherein wherein the optical element includes a mirror at a focal point of the second lens in the connected position.

7. The optical connector as claimed in claim 6, wherein the guiding element includes a waveguide in the fourth slab and a cladding layer on a surface of the fourth slab.

8. The optical connector as claimed in claim 1, wherein:
the first part includes a plurality of first lenses; and
the second part includes:
a plurality of second lenses, the second lenses located to be in alignment with respective first lenses in the connected position;
a plurality of optical elements, each optical element configured to direct light between a respective second lens and at least one optical fibers.

9. The optical connector as claimed in claim 8, wherein the plurality of first lenses, the plurality of second lenses and the plurality of optical elements are arranged in respective linear arrays.

10. The optical connector as claimed in claim 1, further comprising:
a first housing part holding the first part and having a first connector element; and
a second housing part holding the second part and having a second connector element engageable with the first connector element to hold the first housing part and the second housing part together in the connected position.

11. The optical connector as claimed in claim 1, wherein the optically transparent material is one of silica, a glass and a polymer.

12. An optical assembly comprising:
a photonic circuit including a grating coupler;
an optical fiber; and
an optical connector, the optical connector comprising:
a first part, fixable to a photonic circuit, comprising a first slab of optically transparent material and a second slab of optically transparent
a first lens situated at an interface between the first slab and the second slab, the first lens having a focal point at a position of the photonic circuit, the first lens being configured to collimate light in the second slab; and
a second part, movable between a connected position adjacent the first part and a disconnected position removed from the first part, the second part comprising:
a third slab of optically transparent material and a fourth slab of optically transparent material, the third slab being adjacent to the second slab in the connected position;
a second lens situated at an interface between the third slab and the fourth slab the second lens having a focal point at a position of an optical element, the second lens being configured to collimate light waves in the third slab, the second lens being located to be in alignment with the first lens in the connected position; and
one or more guiding elements arranged to direct light between the second lens and an optical fiber.

13. The optical connector as claimed in claim 3, wherein the first lens is inset in a surface of the first slab and the second lens is inset in a surface of the fourth slab such that a gap is provided between the first lens and the second lens.

14. The optical connector as claimed in claim 1, wherein the optical element comprises:
a waveguide; and
a routing element provided at one end of the waveguide, the routing element arranged to direct light output from the waveguide towards the second lens.

15. The optical connector as claimed in claim 14, wherein the routing element is a mirror provided at the one end of the waveguide, at a focal point of the second lens.

16. The optical connector as claimed in claim 15, wherein the waveguide is fourth slab and a cladding layer is provided on the fourth slab.

17. The optical connector as claimed in claim 2, wherein:
the first part includes a plurality of first lenses; and
the second part includes:
a plurality of second lenses, the second lenses located to be in alignment with respective first lenses in the connected position; and
a plurality of guiding elements; and
wherein the second part is configured to connect the guiding elements to respective optical fibers.

18. The optical connector as claimed in claim 17, wherein the plurality of first lenses, the plurality of second lenses and the plurality of guiding elements are arranged in respective linear arrays.

19. The optical connector as claimed in claim 2, further comprising:
a first housing part holding the first part and having a first connector element; and
a second housing part holding the second part and having a second connector element engageable with the first connector element to hold the first housing part and the second housing part together in the connected position.

20. The optical connector as claimed in claim 3, wherein the at least one guiding element comprises:
a waveguide; and
a routing element provided at one end of the waveguide, the routing element arranged to direct light output from the waveguide towards the second lens.

* * * * *